Nov. 25, 1958 G. B. MANGOLD ET AL Re. 24,570
PERMEABLE CONCRETE
Original Filed Jan. 19, 1952
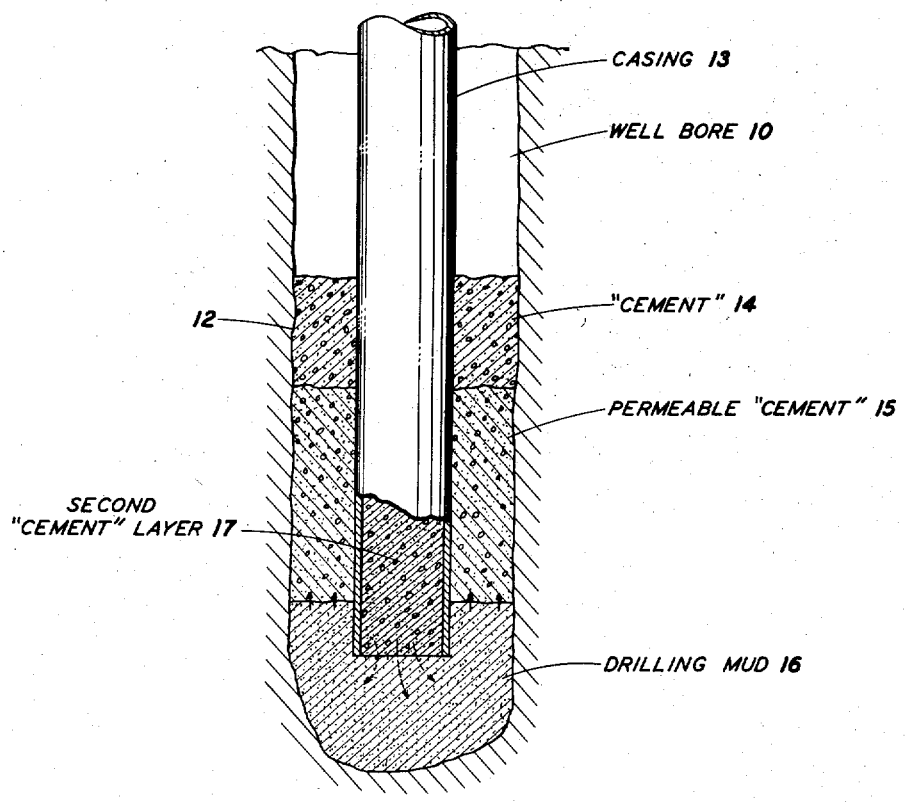
GEORGE B. MANGOLD
JAMES A. DYER
JOHN T. HART
INVENTORS.
BY James B. Christie
ATTORNEY United States Patent Office Re. 24,570
Reissued Nov. 25, 1958

24,570

PERMEABLE CONCRETE

George B. Mangold, Los Angeles, Calif., James A. Dyer, Kings Ferry, N. Y., and John T. Hart, Monrovia, Calif., assignors, by mesne assignments, to Florent H. Bailly, Pasadena, Calif.

Original No. 2,793,957, dated May 28, 1957, Serial No. 267,218, January 19, 1952. Application for reissue February 21, 1958, Serial No. 719,986

3 Claims. (Cl. 106—86)

Matter enclosed in heavy brackets [ ] appears in the original patent but forms no part of this reissue specification; matter printed in italics indicates the additions made by reissue.

This invention relates to permeable concrete which is characterized by a permeability higher than that of a conventional concrete. The permeable material may be so compounded as to yield a permeability as much as five thousand times that of present materials. The composition of the invention is properly referred to as a concrete for the reason that it includes an aggregate in addition to sand and cement and other components.

Under many circumstances a permeable concrete would serve a highly useful function. One example of such a situation is oil well cementing and the invention is particularly described in relation to such use. Other uses for permeable concrete will become apparent as its properties are herein discussed.

In oil field parlance the word "cement" is used to include a true concrete as well as a neat cement and in conformity with the terminology of the art the material of the present invention, although a concrete, is referred to as "cement" when describing its use in oil field practice.

In cementing oil wells, the usual practice is to pump a cement slurry (made of water and conventional inorganic cement, such as Portland cement) down through the interior of the casing or pipe and force it up from the bottom into the annulus between the casing and the formation. A sufficient amount of cement slurry is used so that this annulus is filled to the desired height. The cement, when set, anchors and supports the casing, supports the formation and seals off formation zones from intercontamination by fluids and gases. When hydrocarbon production is desired from a particular zone, the casing and set cement opposite that zone are gun-perforated and the oil and gas are recovered through these perforations.

The conventional cement slurry for this use is, when composed of cement and water, referred to as "neat cement." The cement may include other materials such as aggregates, particularly lightweight aggregates, dispersing agents, bentonite, pozzolans, accelerating or retarding chemicals, bridging agents, etc. Regardless of its composition this cement has heretofore been relatively impermeable, having a permeability in the order of less than one millidarcy. Such cements and concretes are hereinafter referred to as "impermeable" cement as distinguishing from the permeable concrete of the present invention.

There are many problems encountered in this method of oil well completion. Among these is the fact that a cement slurry composed predominantly of very fine particles may be unintentionally forced into the producing formation and thereby reduce its permeability. Mechanical or gun-perforation of the set cement may not reach the actual formation, and to avoid this difficulty necessitates provision of an undesirably small annulus between the casing and the formation. Other completion methods have been developed in an attempt to improve these conditions including gravel packing and pre-packed liners. Each of these methods has characteristics peculiar to it, a discussion of which would serve no useful purpose in this disclosure.

We have now discovered a concrete composition and a method of preparing a concrete, which, upon setting, will be permeable and which is found to be more permeable in most cases than the formation which it contacts. For oil well completion and other problems hereinafter mentioned wherein extremely high compressive strength is not a requisite, the permeable concrete of the invention is superior to conventional concretes in serving a purpose not presently duplicated.

It is difficult, if not impossible, to define the composition of a concrete after setting, and hence the usual practice is to define the cement slurry composition which, upon setting, results in a concrete of the properties desired. A concrete in accordance with the invention comprises, as a slurry, cement, water, a first aggregate of a predetermined particle size distribution, a second aggregate of a predetermined particle size distribution differing from that of the first aggregate and such as to result in a gap in the over-all particle size distribution of the two aggregates, and a stabilizer which is, for present purposes, preferably a pozzolanic material.

Although not necessarily so limited, lightweight aggregates are presently preferred because of their angular, irregular particle configuration and low density, these factors facilitating adhesion and uniformity. Lightweight aggregates may be classified as follows:

(1) Natural aggregates; pumice, scoria, volcanic cinders and volcanic ash, diatomite, diatomaceous earth.

(2) Expanded aggregates (utilizing heat to accomplish expansion); clay, shale, slate, diatomaceous earth, perlite, obsidian, vermiculite.

(3) Expanded aggregates (utilizing cooling to accomplish expansion); blast furnace slag.

(4) Sintered aggregates; shale, clay, fly ash, slag. These aggregates have a unit weight up to about 75 pounds per cubic foot and a bulk specific gravity of from about 0.6 to 2.4 according to ASTM specifications. A concrete including such aggregates will have a cured weight of from 20 to 105 pounds per cubic foot as compared to a cured weight of 120 or more pounds per cubic foot exhibited by concrete employing the more conventional heavy aggregates.

A "stabilizer," as the term is used in this application, refers to materials used for the purpose of preventing or minimizing segregation of the larger particles. This may be accomplished by finely divided materials which, when distributed throughout the concrete slurry, increase the apparent viscosity (decreased slump) without decreasing the pumpability of the mixture. The distribution of these fine particles and the improved consistency act to prevent segregation of the larger and heavier particles. There are many materials used in the industry for this purpose but we have found that the pozzolanic materials are to be preferred in the concrete of the present invention because of the increase in compressive strength consequent upon such use.

A pozzolan is defined as any siliceous and aluminous material, natural or artificial, processed or unprocessed, which contains constituents not cementitious in themselves but which will, in finely divided form and in the presence of moisture, react with calcium hydroxide at ordinary temperatures to form relatively stable and water insoluble compounds possessing cementitious properties, i. e. setting up to a solid. Natural pozzolans may be derived from volcanic rocks and include pumicites or volcanic ashes, pumice or pumice stone, obsidian, scoria, tuffs and some of the andesites, or they may be derived from rocks in which the silica has a high opaline content including diatomites or diatomaceous earths, cherts, shale, clays and pure opal. Moreover, pozzolans include fly ash or flue dust, certain boiler and furnace slags, burnt ground brick and by-products of certain industrial processes.

The invention is in no way limited to the particular aggregate or pozzolan employed, nor is the foregoing listing intended as exclusive. Substantially any lightweight aggregate and pozzolan may be used in production of a permeable concrete in accordance with presently preferred practice. Moreover, mixtures of these materials may be used in a single batch of concrete. For example, one type of aggregate may be used in one particle size distribution and another type of aggregate may be used in the second particle size distribution. Further, each range of aggregate particle size may comprise two or more different materials if such practice appears expedient for economic or other reasons. Choice of materials will be dictated in large measure by availability and economies which will vary from location to location.

The use of two aggregates of differing particle size, and which together leave a gap in the over-all particle size distribution, is very important to the accomplishment of the objectives of the invention.

The particle size gap should encompass a range of at least 3 or 4 mesh sizes, as for example the particle size range of from 7 to 9 mesh inclusive. We have found that omission of this particular range of aggregate particles results in a maximum resultant permeability. The permeability of the concrete may, in fact, be roughly predetermined by proper selection of the aggregate sizes; the omission of particles of smaller size than the above range resulting in a somewhat lower permeability. In general we prefer to employ a coarse aggregate having a minimum particle size in the range of from 6 to 10 mesh and a fine aggregate having a maximum particle size of from about 10 to 20 mesh, the two aggregates being selected such that there is a size range between the aggregates of at least 3 mesh sizes in which there are substantially no aggregate particles.

Uniform particle size distribution in the ranges selected is desirable. Such uniform distribution facilitates adhesion and in so doing increases the strength of the resultant concrete.

It is also apparent that the characteristics of an aggregate play an important part in achieving a highly permeable material since the lightweight aggregates produce a concrete of considerably greater permeability than do the so-called heavy aggregates. In addition, the heavy aggregates are susceptible to undesirable segregation when used in *some of* the proportions [required] *set forth* herein. These aggregates are more difficult to hold together in a uniform mass because of their greater density and generally smoother and more regular particle configuration.

The following table sets forth the various ingredients of a slurry in accordance with the invention, resulting in a permeable set concrete and the permissible and preferred ranges of the proportioning of these materials.

TABLE I

| Component | Permissible Range in Parts by Weight | Preferred Composition in Parts by Weight |
|---|---|---|
| Cement | 1 | 1 |
| Water | 1.5 to 2.5 | 2 |
| Pozzolan (stabilizer) | 0.10 to 0.40 | .33 |
| Aggregate: | | |
| (a) 10 to 100 mesh and | 1.0 to 2.0 | 1.65 |
| (b) 3 to 6 mesh | 4.0 to 7 | 5.75 |

A concrete having a slurry composition as indicated as preferred in the above table, will have essentially the following properties:

TABLE II

A. Average properties of slurry:
- Density:
  - 12 lbs. per gal.
  - 90 lbs. per cu. ft.
- Void space: 25%
- Yield:
  - 1 gal. per lb. of cement
  - 94 gals. per sack of cement
  - 12½ cu. ft. per sack of cement B. Properties of set cement:
- Permeability: 8.5 to 9.5 darcies
- 3-day compressive strength: 400 p. s. i.
- 17-day compressive strength (ambient curing): 1000 p. s. i.

As mentioned above, a concrete of somewhat lower permeability may be produced if desired by shifting the excluded particle size range of aggregate. Thus a first aggregate having a minimum particle size of approximately 8 mesh and a second aggregate having a particle size distribution of from about 20 to 100 mesh may be used in place of the aggregates identified in Table I. Other variations are also possible and even desirable under certain circumstances.

A presently preferred method for compounding the slurry in accordance with the invention involves the following steps:

(1) Thoroughly mix the dry cement and pozzolan. This pre-mix of the stabilizer and cement is important because of the fine particle size of each, which makes even distribution difficult with wet material.

(2) Thoroughly mix the cement-stabilizer mixture with aggregate.

(3) Add the required amount of water and mix the entire slurry.

Of the many forms of stabilizers in general and pozzolans in particular available for such use, an oil impregnated diatomaceous earth, calcined and ground is presently preferred and the same material in the larger mesh sizes is preferred as a lightweight aggregate.

Preferred practice of using the permeable concrete of the invention in oil well completion is best described with reference to the accompanying drawing which is a vertical section through the lower portion of a well bore. In the drawing, a well bore 10 is shown traversing formations 12, and is provided with the usual casing 13 projecting just short of the bottom of the bore. In completing a well of this type in accordance with one method of the invention, a layer 14 of conventional "cement" or concrete slurry is pumped into the annulus defined by the casing and well bore and is followed by a layer 15 of permeable concrete slurry compounded as herein described, which is in turn followed by a layer 16 of a viscous oil base drilling fluid and another layer 17 of conventional concrete slurry. The fluid stream composed of the conventional slurry, permeable cement slurry, drilling mud and conventional slurry, is positioned with respect to its height in the annulus in the usual manner by controlling the quantities of each pumped into the well bore.

The oil base drilling mud used for this purpose is preferably composed of an asphalt-free crude or fuel oil base containing an oil soluble metallic ester. Asphaltic materials are not objectionable for use at low bottom hole temperatures but are objectionable for use at high temperatures for reasons hereafter apparent. Weighting materials are preferably left out of the mud as adversely affecting the mud density for this specific purpose.

The oil base drilling mud migrates into the void spaces of the permeable concrete slurry while setting is taking place. In this manner intrusion of the adjacent regular cement slurry is prevented, it being apparent that such intrusion would materially reduce the resultant permeability. The amount of mud used should be calculated at approximately that required to fill these voids so that the trailing layer of conventional slurry will be contiguous to the permeable material. When the casing is perforated the thus occluded mud finds its way out of the permeable layer. At high temperatures any asphaltic materials in the mud tend to polymerize and in so doing adversely affect the permeability of the concrete. The induced intrusion of the mud has the further purpose of preventing intrusion of formation fluids which may leach or otherwise interfere with the structure of the permeable slurry.

The described permeable cement in slurry and cured form exhibits the following properties and advantages when used in the manner described for oil well completion:

(1) It is a thick but pumpable slurry with little tendency towards segregation.

(2) It contains too small a proportion of fines and those that are present are so tightly held that formation plugging is avoided.

(3) It will fill any size hole drilled for efficient production or any sizable fractures and crevices, and hence support the fractures and crevices, and will not interfere with the advantageous permeability thereof.

(4) It sets with sufficient strength to support casing and formation and it sets well under high temperatures and pressures which may be encountered in a well bore.

(5) It sets in the presence of oil or oil base fluid, leaving the concrete oil wet and providing better flow characteristics for oil recovery.

(6) A high permeability throughout the mass is preserved after it is set since no reorientation takes place during setting.

(7) The liner need not be perforated until after the slurry has set, which allows the use of large sized perforations.

As mentioned, the slurry may be preceded by a regular cement slurry followed by the oil base drilling fluid and lastly followed by another amount of regular cement slurry. The latter supports the permeable cement and may be used to shut off the lower formation zones if desirable. Care should be taken that the density of the leading slurry be at least as low as that of the permeable concrete, and that its viscosity be sufficient to prevent segregation.

As an alternative procedure the entire bottom hole may be filled with permeable concrete. In such application the casing is drilled out after the concrete sets and a thin slurry of regular cement is pumped in to permeate a short distance into the permeable concrete. This procedure seals off and strengthens the exposed surfaces of the permeable material.

The invention has thus far been described particularly with relation to the use of the defined permeable concrete in oil well completion techniques. This is a vast field and one in which a permeable concrete may well revolutionize present practices. It is even likely that the discovery of this type of concrete may enable elimination from oil wells of the conventional casing. Such an eventuality would, of course, save millions of dollars and large amounts of steel.

The permeable concrete has other very significant potentialities. For drainpipes, non-structural surfaces, gutters and the like, the property of permeability is very beneficial. One prime example is tennis courts, where permeability to water would permit the court to dry after a rain or washing much faster than is the case with impermeable concretes. In drainpipes and for street gutters and other drainage systems, permeation of water through the concrete would reduce the loading of the system and would also return to the earth water which is much needed in many localities and which is now generally dumped in the ocean. Many other uses for the permeable concrete of the invention will undoubtedly occur when its properties become generally known.

We claim:

1. A concrete characterized by a relatively high permeability to liquids which as a slurry consists essentially of approximately 1 part of Portland cement, 0.10 to 0.40 part of a pozzolan, 4.0 to 7.0 parts of a first [lightweight] aggregate having a particle size distribution of from about 3 to about 6 mesh, 1.0 to 2.0 parts of a second [lightweight] aggregate having a particle size distribution of from about 10 mesh to about 100 mesh, there being substantially no aggregate particles in the size range of from about 7 to about 9 mesh, and water.

2. A concrete characterized by a relatively high permeability to liquids which as a slurry consists essentially of approximately 1 part of Portland cement, 0.10 to 0.40 part of a pozzolan, up to 7.0 parts of a coarse [lightweight] aggregate having a minimum particle size of from about 6 to about 10 mesh, up to 2.0 parts of a fine [lightweight] aggregate having a maximum particle size of from about 10 to about 20 mesh, the two aggregates having respective particle size distributions such that there is a range of at least 3 mesh sizes between the coarse and fine aggregates in which there are substantially no aggregate particles, and water.

3. A concrete characterized by a relatively high permeability to liquids which as a slurry consists essentially of approximately 1 part of Portland cement, 0.10 to 0.40 part of a pozzolan, 4.0 to 7.0 parts of a fine [lightweight] aggregate having a maximum particle size of about 3 mesh, 1.0 to 2.0 parts of a fine [lightweight] aggregate having a maximum particle size in the range of 10 to 20 mesh, the minimum particle size of the coarse aggregate and the maximum particle size of the fine aggregate being controlled such that there is a range of from 3 to 4 mesh sizes between the two aggregates in which there is substantially no aggregate particles, and water.

References Cited in the file of this patent or the original patent

UNITED STATES PATENTS

| | | |
|---|---|---|
| 1,011,484 | Perkins et al. | Dec. 12, 1911 |
| 1,057,789 | Wigle | Apr. 1, 1913 |
| 1,314,752 | Olsen | Sept. 2, 1919 |
| 1,483,689 | Smith | Feb. 12, 1924 |
| 1,710,921 | Cross | Apr. 30, 1929 |
| 1,711,027 | Luzzatti | Apr. 30, 1929 |
| 1,805,431 | Ryder | May 12, 1931 |
| 1,862,702 | Oswalt | June 14, 1931 |
| 1,896,212 | Woods | Feb. 7, 1933 |
| 1,932,971 | Hutteman et al. | Oct. 31, 1933 |
| 2,285,302 | Patterson | June 2, 1942 |
| 2,524.947 | Wallace | Oct. 10, 1950 |